United States Patent
Ware et al.

(10) Patent No.: US 11,544,760 B1
(45) Date of Patent: Jan. 3, 2023

(54) SYSTEMS AND METHODS FOR PROVIDING PERSONALIZED INFORMATION

(71) Applicant: Sunrise R&D Holdings, LLC, Cincinnati, OH (US)

(72) Inventors: Ryan Ware, Highland Heights, KY (US); Chris Daniels, Southgate, KY (US); John Musgrave, Cincinnati, OH (US); Brenda S. Suits, Maineville, OH (US); Anna Willoughby, Cincinnati, OH (US); Zach Martin, Mason, OH (US)

(73) Assignee: SUNRISE R&D HOLDINGS, LLC, Cincinnati, OH (US)

( * ) Notice: Subject to any disclaimer, the term of this patent is extended or adjusted under 35 U.S.C. 154(b) by 4 days.

(21) Appl. No.: 16/219,142

(22) Filed: Dec. 13, 2018

(51) Int. Cl.
*G06Q 30/00* (2012.01)
*G06Q 30/06* (2012.01)
(Continued)

(52) U.S. Cl.
CPC ..... *G06Q 30/0631* (2013.01); *G06Q 30/0267* (2013.01); *G06Q 30/0271* (2013.01); *G06V 20/20* (2022.01)

(58) Field of Classification Search
CPC ........... G06Q 30/0631; G06Q 30/0267; G06Q 30/0271; G06Q 30/0643; G06Q 30/0641;
(Continued)

(56) References Cited

U.S. PATENT DOCUMENTS

| | | | |
|---|---|---|---|
| 2009/0313138 A1* | 12/2009 | Ratnakar | G01S 5/0018 705/26.1 |
| 2010/0046842 A1* | 2/2010 | Conwell | H04N 1/00307 382/218 |

(Continued)

FOREIGN PATENT DOCUMENTS

| | | | | |
|---|---|---|---|---|
| WO | WO-2019191516 A1 * | 10/2019 | | G06K 9/00671 |

OTHER PUBLICATIONS

Zhu, Wei, et al. "Personalized in-store e-commerce with the promopad: an augmented reality shopping assistant." Electronic Journal for E-commerce Tools and Applications 1.3 (2004): 1-19. (Year: 2004).*

*Primary Examiner* — Matthew E Zimmerman
(74) *Attorney, Agent, or Firm* — Stites & Harbison, PLLC; Terry L. Wright; James R. Hayne (57) ABSTRACT

Systems and methods for providing personalized information to a registered customer of a business make use of a central computer server and a database that is in communication with the central computer server. The database includes data associated with the registered customer and data associated with products offered by the business, and is managed by the central computer server. A mobile device associated with the registered customer communicates with the central computer server via a software application running on the mobile device, and an image of a selected product is thereby communicated from the mobile device to the central computer server. Upon the identification of the selected product from the image, data associated with the selected product is retrieved and compared to data associ- (Continued)

ated with the registered customer to thereby transmit personalized information to the mobile device of the registered customer based on that comparison.

18 Claims, 3 Drawing Sheets

(51) Int. Cl.
*G06Q 30/02* (2012.01)
*G06V 20/20* (2022.01)

(58) Field of Classification Search
CPC ............ G06Q 30/0639; G06K 9/00671; G06T 19/006
See application file for complete search history.

(56) References Cited

U.S. PATENT DOCUMENTS

| | | | |
|---|---|---|---|
| 2013/0018782 A1* | 1/2013 | Zhou | G06Q 20/3274 705/39 |
| 2013/0159097 A1* | 6/2013 | Schory | G06Q 30/0267 705/14.49 |
| 2014/0222558 A1* | 8/2014 | Spivack | G06F 3/0488 705/14.51 |
| 2014/0254934 A1* | 9/2014 | Laxminarayana Bhat | G06F 16/58 382/173 |
| 2014/0279246 A1* | 9/2014 | Chen | G06Q 30/0631 705/26.61 |
| 2014/0279294 A1* | 9/2014 | Field-Darragh | G06Q 30/0282 705/28 |

* cited by examiner

SYSTEMS AND METHODS FOR PROVIDING PERSONALIZED INFORMATION

TECHNICAL FIELD

The present invention relates to systems and methods for providing personalized information. In particular, certain embodiments of the present invention relate to systems and methods for providing personalized information that make use of data associated with products offered by a business and data associated with customers of a business to transmit personalized information about a product to a mobile device of a registered customer.

BACKGROUND

Retailers, including a number of online retailers, often allow for product detection through the use of a software application on a customer's mobile device. In such applications, the mobile device's camera is first used to obtain an image of the product. That image is then processed and subsequently linked to a web page that, in turn, provides information to the customer about the product, such as pricing, reviews, manufacturer specifications, and the like. Moreover, in making use of the mobile devices of customers, certain retailers have also utilized augmented reality technology that, in communicating through a software application running on the customer's mobile device, overlays three-dimensional (3D) images of products onto the customer's environment by interacting with the camera of the customer's mobile device. In both instances, however, no customization or personalization of information is provided to the registered customer. Rather, in those applications, the same data or images are generally presented to every customer in response to each request from a customer via their mobile device. Accordingly, a system and method that allows customers to interact with a product offered by a business and, in return, receive additional personalized information about those products would be both highly desirable and beneficial.

SUMMARY

The present invention includes systems and methods for providing personalized information. In particular, certain embodiments of the present invention include systems and methods for providing personalized information that make use of data associated with products offered by a business and data associated with customers of a business to transmit personalized information about a product to a mobile device of the registered customer.

In one exemplary implementation of a system and method for providing personalized information to a registered customer of a business, a customer initially registers with the business and is in communication with a central computer server and associated database. In registering, the customer typically provides customer identifying information, such as the customer's name, location, contact information, and the like, but also further includes data associated with personal preferences and attributes of the registered customer such as, in the context of grocery shopping, allergies, dietary needs, preferred recipes, pharmacy information including potential drug interactions, product preferences, and/or data associated with the customer's loyalty or rewards account. The collected data about the registered customer is then stored in the database, along with data associated the products of the business, such as product data related to the appearance of the product, pricing information, advertisements associated with the product, available discounts or coupon opportunities, customer reviews, and the like.

To register as a customer of the business, the customer typically installs a software application (or "app") on a mobile device that allows the registered customer to interact with the central computer server and the associated database. Such mobile devices include, but are not limited to, smartphones, tablets, or similar computing devices with a microprocessor, an internal memory component (e.g., a hard drive or solid-state drive), a display screen, and a camera. Communications between the central computer server and the mobile device of a registered customer are generally facilitated through an internet connection, satellite communication, or other communications network or similar known means of data transport.

To facilitate the compiling and analysis of the data associated with a registered customer of a business and the data associated with the products offered by the business, the database is managed by the central computer server that is also in communication with the mobile device of the registered customer. As such, to provide personalized information to a registered customer from the central computer server when a registered customer is shopping at the business, the registered customer uses his or her mobile device and its associated camera to capture and transmit an image related to a selected one of the products offered by the business. The central computer server then receives the image transmitted from mobile device via the software application running on the mobile device of the registered customer.

Upon receiving the image related to the selected one of the products, the central computer server, at least in part, processes the received image based on the stored appearance of the product or other such identifying data, and, in turn, identifies the selected product. Once identified, the data associated with the selected product is then retrieved from the database by the central computer server and that data is compared with the data associated with the particular registered customer such that information that is specific to that particular registered customer can then be transmitted from the central computer server to the mobile device of the particular registered customer. In other words, the personalized information that is transmitted to the mobile device of the particular registered customer is based on a comparison between the data associated with the product selected by the customer and the data associated with that particular registered customer. In certain implementations, the personalized information that is transmitted is thus a dynamic determination whereby, upon the processing of an image related to a selected one of the products, the particular registered customer's current loyalty or rewards account information, inputted preferences, location of their mobile device, and/or combinations thereof is compared to the data currently associated with a product, and, based on that comparison, information can be transmitted to the mobile device of the registered customer that is not only specific to the preferences, location, etc. of the registered customer, but that can also be tailored to the current preferences of the business.

To provide the personalized information to the registered customer, in some implementations, the personalized information transmitted to the mobile device of the registered customer is transmitted to the customers by digitally overlaying the personalized information onto the image of the selected product being viewed by and shown on the mobile device of the registered customer. In this way, the systems and methods of the present invention thus further provide augmented reality ("AR") applications that, through the interaction between the camera of a customer's mobile device with a selected product, personalized information in the form of, for example, personalized pricing, advertisements, characteristics of the selected products (e.g., allergen information, servings, calories), or recommendations regarding another product offered by the business (e.g., a related product commonly purchased with the selected product) is overlaid directly onto the image related to the selected product as the image is viewed by the registered customer on their mobile device.

Further features and advantages of the present invention will become evident to those of ordinary skill in the art after a study of the description, figures, and non-limiting examples in this document.

DESCRIPTION OF EXEMPLARY EMBODIMENTS

The present invention includes systems and methods for providing personalized information. In particular, certain embodiments of the present invention include systems and methods for providing personalized information that make use of data associated with products offered by a business and data associated with customers of a business to transmit personalized information about a product to a mobile device of the registered customer.

Figure 1:
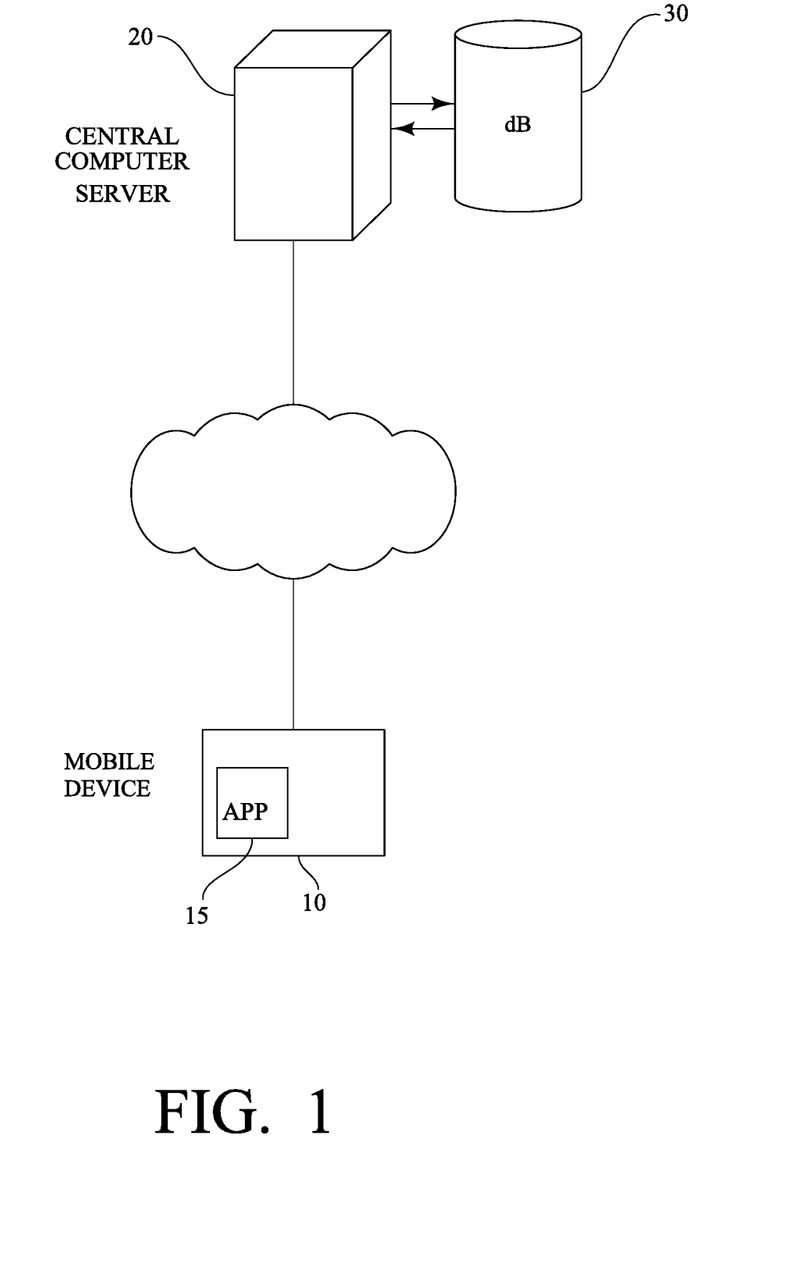
FIG. 1 is a schematic diagram showing an exemplary system for providing personalized information to a registered customer of a business in accordance with the present invention.

With reference to FIG. 1, in one exemplary implementation of a system and method for providing personalized information to the registered customers of a business, a customer initially registers as a customer of the business and is in communication with a central computer server 20 and associated database 30. In registering, the customer typically provides customer identifying information, such as the customer's name, location, contact information, and the like, but also further includes other data specific to that customer's shopping and other preferences, as described in further detail below. The collected data about each of the registered customer is then stored in the database 30.

As shown in FIG. 1, to register as a customer of the business, the customer typically installs a software application (or "app") 15 on a mobile device 10 that allows the registered customer to interact with the central computer server 20 and the associated database 30. Such mobile devices 10 include, but are not limited to, smartphones, tablets, or similar computing devices with a microprocessor, an internal memory component (e.g., a hard drive or solid-state drive), a display screen, and a camera. Communications between the central computer server 20 and the mobile device 10 of a registered customer are generally facilitated through an internet connection, satellite communication, or other communications network or similar known means of data transport. Of course, in some implementations, it is also contemplated that at least some registered customers could also be in communication with the central computer server 20 and associated database 30 via a desktop or personal computer with a software component that communicates with the central computer server 20, such as via a web-based application accessible through a common internet browser.

With respect to the database 30 included and utilized in the exemplary systems and methods for providing personalized information shown in FIG. 1, and as described above, the database 30 initially receives and stores data about each of the registered customers, including the customer's login credentials, name, location, and/or contact information. However, the database 30 further collects data associated with personal preferences and attributes of the registered customer such as, in the context of grocery shopping, allergies, dietary needs, preferred recipes, pharmacy information such as potential drug interactions, product preferences, etc. The data associated with the registered customer can also include or be linked to a loyalty or rewards account associated with a particular registered customer. In this regard, the database 30 is further used to store, or can be linked to another database that collects and stores, point-of-purchase data associated with each of the registered customers each time a registered customer provides his or her loyalty or rewards account information at the time of a purchase. As a result, the database 30 includes personal customer-inputted data (e.g., allergies, recipes, etc.), but further includes and/or makes use of additional collected data including, but not limited to, amount spent in a particular time period (e.g., week, month, year, lifetime), visit frequency, purchase history, the frequency at which a particular product is purchased, the amount of a particular product purchased, and the like.

In addition to storing data associated with each of the registered customers of a business, the database 30 is further used to compile and store data associated with the products offered by the business. Such product data can include, but is not limited to, the appearance of the product, pricing information, advertisements associated with the products, available discounts or coupon opportunities, and customer reviews. Further, in the context of grocery store products, the data about the products can include calories and other nutritional information associated with the products, allergens present in the products, recommended pairings for the products, food recalls, number of servings in a given package, and other such characteristics of the products.

To facilitate the compiling and analysis of the data associated with a registered customer of a business and the data associated with the products offered by the business, the database 30 and, more particularly, the data stored in the database 30 is managed by the central computer server 20 that is also in communication with the mobile device 10 of the registered customer. In this way, in some implementations of the present invention, to provide personalized information to a registered customer from the central computer server 20 when a registered customer is shopping at the business, the registered customer uses his or her mobile device 10 and its associated camera to capture and transmit an image related to a selected one of the products offered by the business. The central computer server 20 then receives the image transmitted from mobile device 10 via the software application 15 running on the mobile device 10 of the registered customer. Of course, in transmitting and receiving such images, it is contemplated that the image related to the product can be, in certain implementations, an image of the product itself, but it is further contemplated that the image can also be an image of other another item useful for identifying a product, such as a price tag, UPC symbol, or other identifying information that is commonly displayed adjacent to a product. For instance, in certain implementations, the image can include product identifying information displayed on an electronic shelf module, such as those described in U.S. Pat. Nos. 9,703,179 and 9,774,134, which are each incorporated herein by reference in their entirety.

In some implementations of the systems and methods of the present invention, and as an alternative to transmitting the entirety of an image to the central computer server 20 for processing, the image captured by the mobile device 10 is first processed, at least in part, by the mobile device 10. For example, in some implementations, the image captured by the mobile device 10 is first processed utilizing the software application 15 running on the mobile device and, in particular, by using an image recognition algorithm that identifies the product included in the image and/or crops and compresses the image down to only the portion of the image that includes characteristics sufficient to identify a particular product from the image, such as an icon or an advertisement that could then be compared against a local database on the mobile device 10 of known icons or advertisements. Once processed, the generated data associated with the image and/or the compressed image can then be transmitted to the central computer server 20 for further processing.

Regardless of the particular type of image or data related to the product that is received by the central computer server 20, upon receiving the image or data related to the selected one of the products, the central computer server 20 then processes the received image or data based on the stored appearance of the product or other such identifying data, and, in turn, identifies the selected product. Once identified, the data associated with the selected product is then retrieved from the database 30 by the central computer server 20 and that data is compared with the data associated with the particular registered customer such that information that is specifically tailored to that particular registered customer can then be transmitted from the central computer server 20 to the mobile device 10 associated with the particular registered customer.

Figure 2:
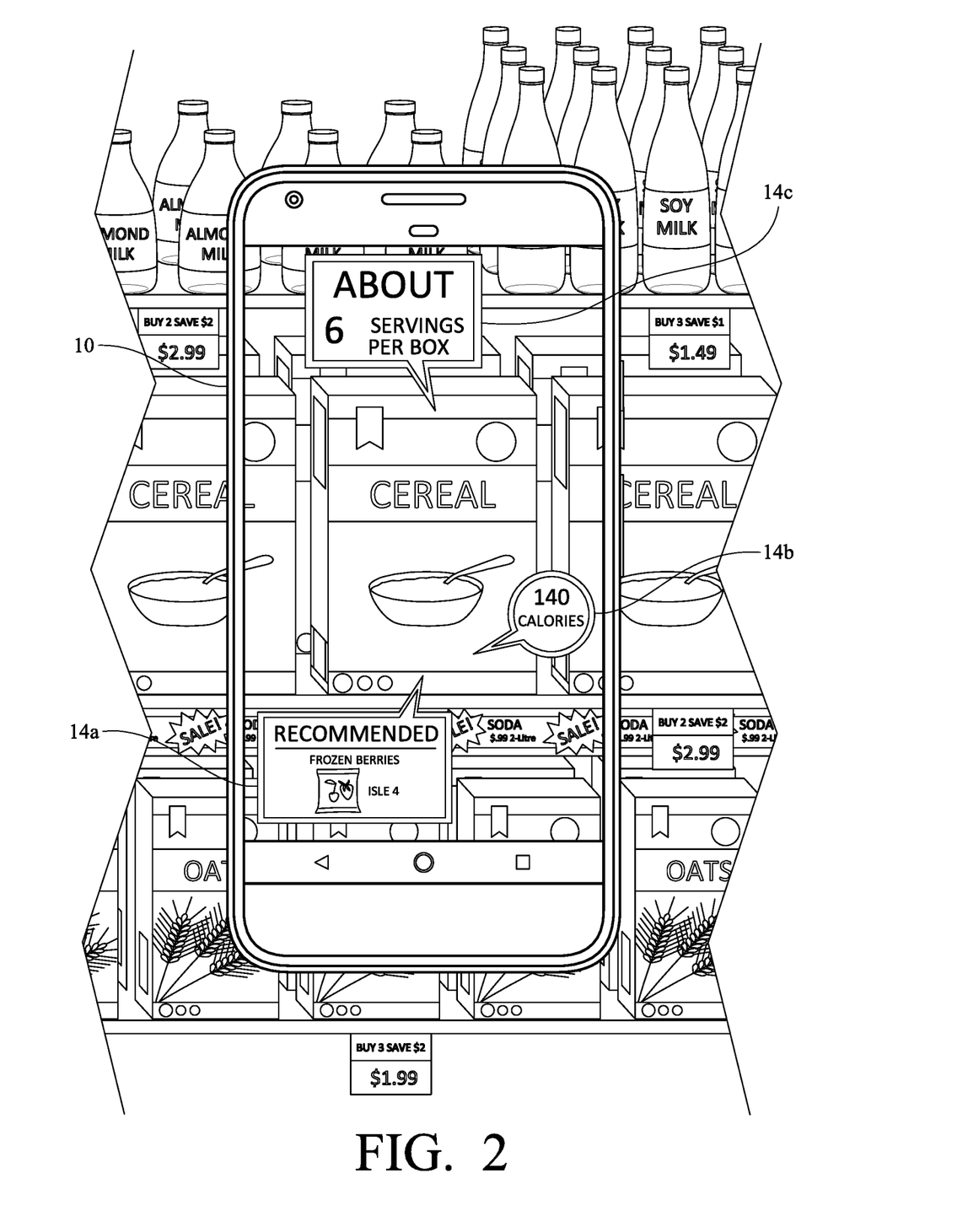
FIG. 2 includes a front view of a smartphone displaying an image of various products of a business and showing an exemplary implementation of a method for providing personalized information to a registered customer of a business in accordance with the present invention.
Figure 3:
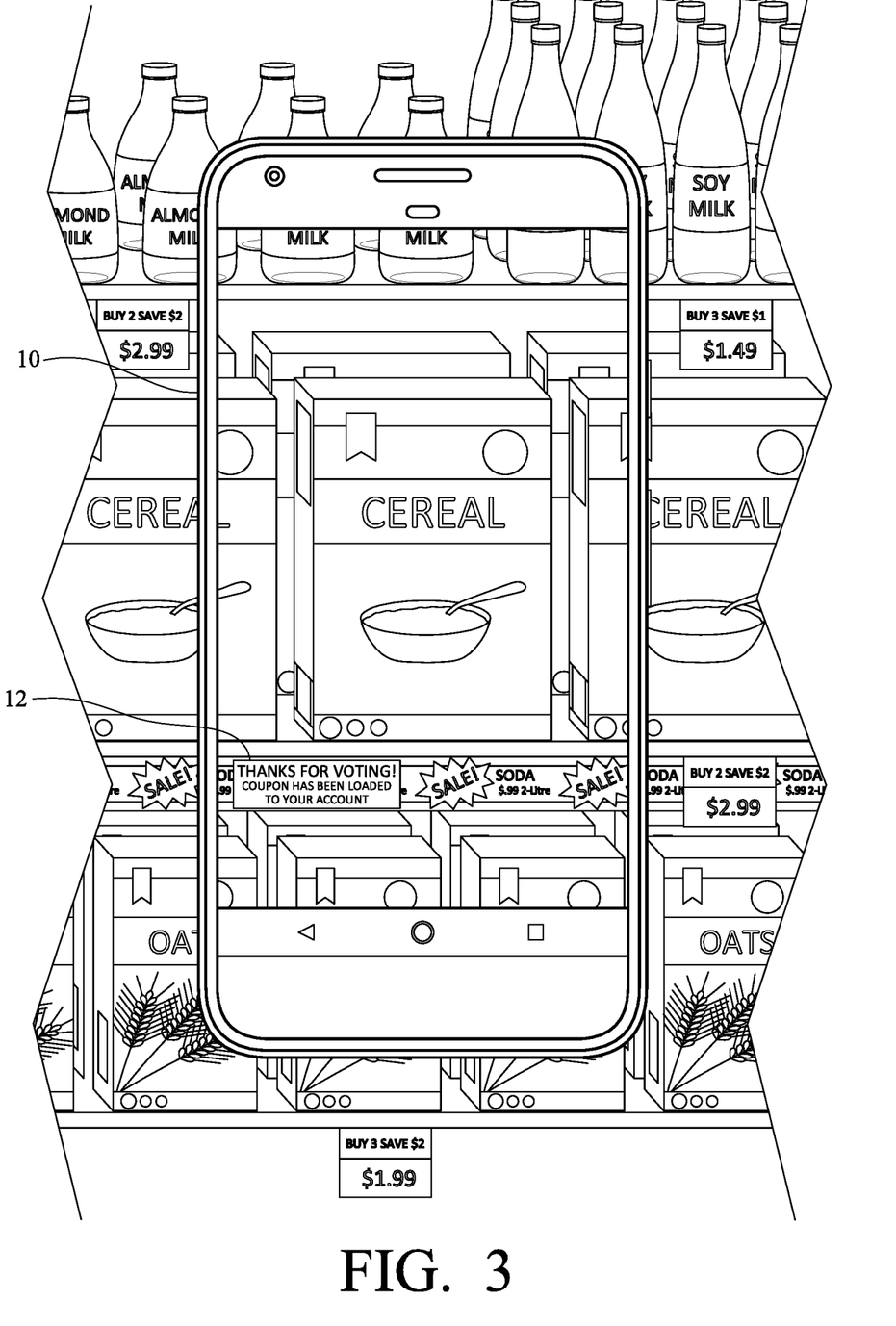
FIG. 3 includes a front view of a smartphone displaying an image of various products of a business and showing another exemplary implementation of a method for providing personalized information to a registered customer of a business in accordance with the present invention.

Referring now more generally to FIGS. 1-3, the personalized information that is transmitted to the mobile device 10 of the particular registered customer is based on a comparison between the data associated with the product selected by the customer and the data associated with that particular registered customer. In certain implementations, the personalized information that is transmitted is thus a dynamic determination whereby, upon the processing of the image related to a selected one of the products, the particular registered customer's current loyalty or rewards account information, inputted preferences, location of their mobile device, or combinations thereof is compared to the data currently associated with a product, and, based on that comparison, information can be transmitted to the mobile device of the registered customer that is not only specific to the preferences, location, etc. of the registered customer, but that can also be tailored to the current preferences of the business.

For example, in some implementations, upon receiving and processing an image or data associated with a particular product, the central computer server 20 accesses the registered customer's loyalty account information and identifies the frequency with which that particular product is purchased by the registered customer. Then, based on a comparison of that loyalty account information with pricing data currently associated with the particular product, the central computer server 20 transmits personalized information to the mobile device of the registered customer in the form of personalized or exclusive pricing for the product that is based on that comparison. In this way, in such implementations, the systems and methods of the present invention thus allow a business to offer exclusive pricing to registered customers of the business that may buy a particular product at an increased frequency.

As another example, in some implementations, and upon receiving and processing an image or data associated with a particular product, the central computer system 20 also receives a present location of the mobile device 10 of the registered customer that is communicated from the software application 15 running on the mobile device 10. The present location of the mobile device 10 along with the image of the selected product can then be compared with the data relating to any promotions available for the selected product at that location. If an active promotion is available for the selected product at that location, personalized information related to the active promotion is then transmitted to the mobile device 10 of the registered customer while they are actively viewing the product at the business.

As yet another example, in some implementations, upon receiving and processing an image or data associated with a particular product, the central computer server 20 compares the data inputted by the registered customer regarding his or her food allergies with data regarding the allergens known to be present in the particular product. Should any allergens be identified in the particular product shown in the received image, the central computer server 20 then transmits personalized information to the mobile device 10 of the registered customer in the form of a warning about a specific allergen that is present in the selected product and that has been identified to the central computer server 20 as being known to cause an allergic reaction in the registered customer.

With further respect to the transmission of personalized information, in certain implementations, the personalized information that is transmitted to the registered customer can also be in the form of an advertisement that is personalized or targeted to a particular registered customer based on the data stored in the database 30 and associated with the particular customer (e.g., the customer's purchase history or other loyalty account information). For instance, in some implementations, upon receiving and processing an image associated with a particular product, the central computer server 20 subsequently accesses the loyalty or reward account data of the customer that is related to the customer's purchase history of that particular product. Depending on the extent to which that customer has purchased that product in a given time period, the central computer server 20 then selects a particular advertisement such that the personalized information transmitted to the registered customer is in the form of a targeted advertisement that is transmitted to the mobile device and that is thought to best promote the selected product to the registered customer based, at least in part, on the preferences or other information related to the registered customer stored in the database 30. In other words, in such implementations, better-targeted advertisements are thus transmitted to a registered customer that are based on the registered customer's associated data.

Further, in some implementations of the systems and methods of the present invention that transmit personalized information in the form of an advertisement to a registered customer, such advertisements can be interactive in nature where, as part of the advertisement that is transmitted to the mobile device 10, the registered customer is requested to answer a question, select an option, give an impression of the selected product, or other similar action. Upon receiving input from the mobile device 10 in response to an interaction with the advertisement by the registered customer on their mobile device, and as perhaps best shown in FIG. 3, the central computer server 20 can then transmit a reward or notification of a reward 12, such as a coupon or other discount for the selected product, to the mobile device 10 that is based on the registered customer's interaction with the advertisement.

To provide the personalized information to the registered customer, in some implementations and referring now more particularly to FIG. 2, the personalized information transmitted to the mobile device 10 of the registered customer is transmitted to the customers in the form of one or more digital overlays 14a, 14b, 14c of the personalized information onto the image of the selected product being viewed by and shown on the mobile device 10 of the registered customer. In this way, the systems and methods of the present invention thus further provide augmented reality ("AR") applications that, through the interaction between the camera of a customer's mobile device with a selected product, personalized information in the form of, for example, personalized pricing, advertisements, characteristics of the selected products (e.g., allergen information, servings, calories), or recommendations regarding another product offered by the business (e.g., a related product commonly purchased with the selected product) is overlaid directly onto the image related to the selected product as the image is viewed by the registered customer on their mobile device 10. For instance, through the use of such AR capabilities, the systems and methods of the present invention can be configured to: overlay customer-exclusive/personalized pricing information onto retail price tags being viewed on the customer's mobile device; overlay customer-defined product attributes onto physical product packaging being viewed on the customer's mobile device; identify related products; provide relevant pairing suggestions; provide recipes, including recipes that can be loaded through the software application running on the customer's mobile device and that can identify all necessary ingredients of recipe and add those to the customer shopping list; expand advertisements related to the selected products beyond the physical boundaries of a physical advertisement located adjacent to a selected product; provide advertisements such as full motion video with sound that can be played through the software application running on the registered customer's mobile device; allow the use of a physical advertisement as the anchor point for advertisements that include a gamified interaction; offer enhanced guided shopping to help customers navigate stores more effectively based on their shopping list or preferences; offer advertisement interaction to receive discounts or coupons, while also tracking the registered customer's impressions; and/or provide registered customers unbiased product reviews and recommendations directly from the central computer server 20 and associated database 30.

Finally, with respect to the central computer servers used in accordance with the present invention, it should be readily apparent to one of ordinary skill in the art that software running on the central computer server causes computer-readable instructions stored in a memory component of the central computer server to be executed by a microprocessor of the central computer server. Similarly, with respect to the app, it should be readily apparent to one of ordinary skill in the art that the app causes computer-readable instructions stored in the memory component of the smartphone, tablet, or other computing device to be executed by the microprocessor of the of the smartphone, tablet, or other computing device. In view of the foregoing description of the system and method of the present invention, such computer-readable instructions can be readily coded into computer readable form using standard programming techniques and languages by one of ordinary skill in the art.

One of ordinary skill in the art will recognize that additional embodiments are also possible without departing from the teachings of the present invention or the scope of the claims which follow. This detailed description, and particularly the specific details of the exemplary embodiments disclosed herein, is given primarily for clarity of understanding, and no unnecessary limitations are to be understood therefrom, for modifications will become apparent to those skilled in the art upon reading this disclosure and may be made without departing from the spirit or scope of the claimed invention.

What is claimed is:

1. A method for providing personalized information to a registered customer of a business, comprising:
   compiling a database including data associated with the registered customer of the business and data associated with products offered by the business, the database managed by a central computer server;
   capturing with a mobile device associated with the registered customer an image of a selected one of the products;
   processing the image locally on the mobile device, via a software application running on the mobile device, to provide data related to the selected one of the products and including an identification of the product, the processing including using an image recognition algorithm that identifies the product included in the image, and cropping and compressing the image down to a portion of the image that includes characteristics to identify the selected one of the products;
   receiving, at the central computer server, the data related to the selected one of the products from the mobile device associated with the registered customer;
   processing the data related to the selected one of the products from the mobile device, via the central computer server;
   retrieving the data associated with the selected one of the products offered by the business from the database;
   comparing the data associated with the selected one of the products offered by the business from the database with the data associated with the registered customer;
   transmitting, via the central computer server, personalized information about the selected one of the products to the mobile device associated with the registered customer, the personalized information based on the comparison of the data associated with the selected one of the products from the database with the data associated with the registered customer, the personalized information comprising an advertisement for the selected one of the products, the advertisement having an interactive component;
   displaying on the mobile device the advertisement for the selected one of the products;
   receiving, at the central computer server, input from the mobile device in response to an interaction with the advertisement by the customer on the mobile device;

transmitting, via the central computer server, a notification of a reward to the mobile device of the customer based on the interaction with the advertisement by the customer;

receiving, at the central computer server, acceptance of the reward by the customer on the mobile device; and transmitting, via the central computer server, the reward to the mobile device of the customer.

2. The method of claim 1, wherein the mobile device is a smart phone.

3. The method of claim 1, further comprising a step of receiving, at the central computer server, a present location of the mobile device, the present location communicated from the software application running on the mobile device.

4. The method of claim 1, wherein the image of the selected one of the products comprises an image of a price tag for the selected one of the products.

5. The method of claim 1, wherein the personalized information further comprises a price of the selected one of the products, a characteristic of the selected one of the products, or combinations thereof.

6. The method of claim 1, wherein the personalized information comprises a recommendation regarding another product offered by the business.

7. The method of claim 1, wherein transmitting the personalized information comprises digitally overlaying the personalized information on the image on the mobile device of the registered customer.

8. A system for providing personalized information to a registered customer of a business, comprising:

a central computer server;

a database in communication with the central computer server, the database for storing data associated with the registered customer and data associated with products offered by the business; and a mobile device including a camera, the mobile device communicating with the central computer server via a software application running on the mobile device, and the mobile device associated with the registered customer, the mobile device configured to capture an image of a selected one of the products and process the image locally on the mobile device, via the software application running on the mobile device, to provide data related to the selected one of the products and including an identification of the product, the processing including using an image recognition algorithm that identifies the product included in the image, and cropping and compressing the image down to a portion of the image that includes characteristics to identify the selected one of the products, wherein the data related to the selected one of the products is communicated from the mobile device to the central computer server via the software application running on the mobile device;

wherein the data related to the selected one of the products from the mobile device is processed by the central computer server, wherein the data associated with the selected one of the products offered by the business is retrieved from the database and compared with the data associated with the registered customer, wherein, based on the comparison of the data associated with the selected one of the products from the database with the data associated with the registered customer, personalized information about the selected one of the products is transmitted from the central computer server to the mobile device, the personalized information comprising an advertisement for the selected one of the products, the advertisement having an interactive component wherein the advertisement for the selected one of the products is displayed on the mobile device, wherein input from the mobile device in response to an interaction with the advertisement by the customer on the mobile device is received at the central computer server, wherein the central computer server transmits a notification of a reward to the mobile device of the customer based on the interaction with the advertisement by the customer, wherein acceptance of the reward by the customer on the mobile device is received at the central computer server, and wherein the central computer server transmits the reward to the mobile device of the customer.

9. The system of claim 8, wherein the mobile device is a smart phone.

10. The system of claim 8, wherein the software application running on the mobile device communicates a present location of the mobile device to the central computer server.

11. The system of claim 8, wherein the software application running on each of the mobile devices overlays the personalized information on the image on the mobile device subsequent to the transmission of the personalized information from the central computer server to the mobile device.

12. The system of claim 8, wherein the image of the selected one of the products comprises an image of a price tag for the selected one of the products.

13. The method of claim 1, wherein processing the image locally on the mobile device comprises using the image recognition algorithm to identify characteristics to identify the selected product, and comparing the characteristics identified by the image recognition algorithm against characteristics included in a local database on the mobile device.

14. The system of claim 8, wherein processing the image locally on the mobile device comprises using the image recognition algorithm to identify characteristics to identify the selected product, and comparing the characteristics identified by the image recognition algorithm against characteristics included in a local database on the mobile device.

15. The method of claim 13, wherein the business is a grocery store.

16. The system of claim 14, wherein the business is a grocery store.

17. The method of claim 1, wherein processing the image locally on the mobile device comprises cropping and compressing the image down to the portion of the image that includes characteristics to identify the selected one of the products; and wherein the data received at the central computer service includes the portion of the image that includes characteristics to identify the selected one of the products.

18. A method for providing personalized information to a registered customer of a business, comprising:

compiling a database including data associated with the registered customer of the business and data associated with products offered by the business, the database managed by a central computer server;

capturing with a mobile device associated with the registered customer an image of a selected one of the products;

processing the image locally on the mobile device, via a software application running on the mobile device, to provide data related to the selected one of the products including an identification of the product, the processing including using an image recognition algorithm that identifies the product included in the image, and cropping and compressing the image down to a portion of the image that includes characteristics to identify the selected one of the products;

receiving, at the central computer server, the data related to the selected one of the products from a mobile device associated with the registered customer;

processing the data related to the selected one of the products from the mobile device, via the central computer server;

retrieving the data associated with the selected one of the products offered by the business from the database;

comparing the data associated with the selected one of the products offered by the business from the database with the data associated with the registered customer;

transmitting, via the central computer server, personalized information about the selected one of the products to the mobile device associated with the registered customer, the personalized information based on the comparison of the data associated with the selected one of the products from the database with the data associated with the registered customer;

displaying on the mobile device the personalized information for the selected one of the products;

receiving, at the central computer server, input from the mobile device in response to an interaction with the personalized information by the customer on the mobile device;

transmitting, via the central computer server, a notification of a reward to the mobile device of the customer based on the interaction with the personalized information by the customer;

receiving, at the central computer server, acceptance of the reward by the customer on the mobile device; and transmitting, via the central computer server, the reward to the mobile device of the customer.

* * * * *